United States Patent [19]
Jordan

[11] Patent Number: 5,940,956
[45] Date of Patent: Aug. 24, 1999

[54] CHEMICAL-MECHANICAL CONTOURING (CMC) METHOD FOR FORMING A CONTOURED SURFACE

[75] Inventor: Stephen G. Jordan, Fremont, Calif.

[73] Assignee: AIWA Co., Ltd., Tokyo, Japan

[21] Appl. No.: 08/741,811

[22] Filed: Oct. 31, 1996

[51] Int. Cl.⁶ .............................. G11B 5/127; G11B 5/33
[52] U.S. Cl. ...................... 29/603.16; 29/603.01; 29/603.14; 29/603.15; 29/603.25; 29/603.19
[58] Field of Search .................. 29/603.01, 603.14, 29/603.25, 603.15, 603.16, 603.19

[56] References Cited

U.S. PATENT DOCUMENTS

| | | | |
|---|---|---|---|
| 4,921,508 | 5/1990 | Nonaka | 29/603 |
| 5,302,233 | 4/1994 | Kim et al. | 156/636 |
| 5,617,273 | 4/1997 | Carr et al. | 360/105 |
| 5,684,660 | 11/1997 | Gray et al. | 360/126 |

*Primary Examiner*—Frank C. Eisenschenk
*Assistant Examiner*—Mary K Zeman
*Attorney, Agent, or Firm*—Skjerven, Morrill, MacPherson, Franklin & Friel LLP; Ken J. Koestner

[57] ABSTRACT

A method of fabricating thin film magnetic heads on a thin film substrate uses a chemical-mechanical contouring (CMC) step after completion of the fundamental thin film head structure to form a curved surface on the substrate for the individual thin film magnetic heads of a substantial plurality of heads on a thin film substrate. A special CMC process utilizes a soft polishing pad, applying mechanical contouring motion at a slow speed, typically on the order of ⅓a typical conventional CMP rotational speed, and at a relatively high pressure, typically two to three times a typical conventional CMP applied pressure.

30 Claims, 6 Drawing Sheets

CHEMICAL-MECHANICAL CONTOURING (CMC) METHOD FOR FORMING A CONTOURED SURFACE

BACKGROUND OF THE INVENTION

1. Field of the Invention

The present invention generally relates to a method for fabricating microelectronic or micro-optical devices or components, including thin film magnetic heads, on a substrate. More specifically, the present invention relates to a chemical-mechanical contouring (CMC) method for forming a locally contoured surface on a thin film substrate.

2. Description of the Related Art

Chemical-mechanical polishing (CMP) is a known technique for planarizing various structures on a thin film substrate. CMP is conventionally used to create a smooth, planar surface for intermediate processing steps of a thin film fabrication process. Specifically, various layers such as metallization layers are deposited and etched during the fabrication of thin film devices on a substrate. These layers are commonly subjected to CMP so that planar deposition of additional layers is achieved. CMP processing not only is used to planarize protruding surfaces, but also to remove undesirable residues that remain from other substrate processing steps.

CMP involves simultaneous chemically etching and mechanical polishing or grinding of a surface so that a combined chemical reaction and mechanical polishing removes a desired material from the substrate surface in a controlled manner. The resulting structure is a planarized substrate surface with protruding surface topography leveled. CMP is typically performed by polishing a substrate surface against a polishing pad that is wetted with a slurry including an acidic or basic solution, an abrasive agent and a suspension fluid.

Thin film magnetic heads, which are constructed using advanced integrated circuit processing techniques, have been developed to improve performance of high density magnetic recording while reducing fabrication cost. Thin film magnetic heads are typically constructed using multiple substrate processing steps, including steps of deposition, etching and planarization of multiple insulative, conductive and magnetic layers. In a typical conventional thin film magnetic head fabrication process, on the order of thousands of thin film heads are formed on a six inch substrate. The substrate is subsequently diced into a large number, typically thousands, of individual thin film heads. Each head is mounted individually, one-by-one on a head mounting block. Each mounted head is subjected to a lapping process to planarize each head, resulting in a planar, rectangular parallelepiped structure. Lapping is a method of reducing the thickness of a substrate slice for applications in which accuracy of the substrate thickness is important to the operation of the device. After lapping processing, a slurry of water and fine grit is used to wear down the back of the slice. The slurry is placed between a flat plate and the back of the slice and the slice is moved with respect to the plate to mechanically remove the substrate material.

The individual lapping of each thin film magnetic head, one-by-one, is tremendously time consuming, greatly raising the cost of each thin film head and the cost of a recording and playback apparatus using thin film heads.

In some processes, the thousands of thin film heads are constructed using multiple processing steps, similar to the processing steps of integrated circuit manufacture. The substrate is then sliced into rows to produce strips typically holding ten to sixteen devices. A row tool is the used, applying a rocking or lapping motion to planarize the multiple heads in a row, resulting in the planar, rectangular parallelepiped structure. The procedure of slicing the substrate into rows greatly improves processing as compared to the alternative of processing each head individually. One disadvantage of this procedure is that the step of slicing the substrate into rows for lapping using a row tool is an extra step that increases manufacturing time and costs.

A disadvantage of the conventional thin film magnetic head having a planar, rectangular parallelepiped structure is that this structure does not furnish an optimum contact of the magnetic tape media.

What is needed is a thin film magnetic head planarization technique which avoids planarization of each head individually. What is further needed is a thin film magnetic head fabrication technique that produces a thin film magnetic head having an improved tape contact.

SUMMARY OF THE INVENTION

In accordance with the present invention, a method of fabricating thin film magnetic heads on a thin film substrate uses a chemical-mechanical contouring (CMC) step after completion of the fundamental thin film head structure to form a curved surface on the substrate for the individual thin film magnetic heads of a substantial plurality of heads on a thin film substrate. A special CMC process utilizes a soft polishing pad, applying mechanical polishing motion at a slow speed, typically on the order of ⅓ a typical conventional CMP rotational speed, and at a relatively high pressure, typically two to three times a typical conventional CMP applied pressure.

Also in accordance with the present invention, a method of fabricating devices or components, including thin film magnetic heads, on a thin film substrate uses a CMC step after completion of the device or component structure to form a curved surface on the substrate.

In accordance with one aspect of the present invention, a final planarization of a plurality of thin film magnetic heads is performed simultaneously before the thin film magnetic heads are diced to substantially reduce thin film magnetic head fabrication time and cost.

In accordance with a further aspect of the present invention, a CMC process is used to advantageously planarize a substantial plurality of thin film magnetic heads simultaneously. A number of the order of thousands of thin film magnetic heads are fabricated simultaneously to substantially reduce fabrication cost.

In accordance with another aspect of the present invention, a CMC process is used to fabricate thin film magnetic heads with a smooth, curved surface having an improved tape media contact.

In accordance with a further aspect of the present invention, a CMC process is used to advantageously planarize a substantial plurality of smooth-surfaced, curved-surface thin film magnetic heads simultaneously.

In accordance with one embodiment of the present invention, a thin film processing method includes the steps of fabricating a finished thin film substrate including a plurality of devices and chemical mechanical contouring (CMC) the thin film substrate subsequent to the fabrication step to form a substantially smooth, curved surface overlying ones of the plurality of devices.

Several advantages are achieved using the disclosed method. One advantage is that the disclosed thin film processing method forms a smoothed thin film structure that improves contact with a magnetic media, thereby improving performance. A further advantage of the fabrication method greatly reduces time and cost of a thin film magnetic head. Another advantage is that the disclosed fabrication method reduces waste by avoiding handling and planarization of each thin film head individually. A further advantage is that the disclosed method fabricates a thin film magnetic head having a curved form which enhances recording media contact and avoids contact of the media to sharp surfaces, thereby degrading the media. It is advantageous that the contoured surface attained by the described thin film processing method is believed to improve contact of a magnetic thin film head to recording media.

BRIEF DESCRIPTION OF THE DRAWINGS

The features of the invention believed to be novel are specifically set forth in the appended claims. However, the invention itself, both as to its structure and method of operation, may best be understood by referring to the following description and accompanying drawings.

DETAILED DESCRIPTION OF THE PREFERRED EMBODIMENTS

Figure 1:
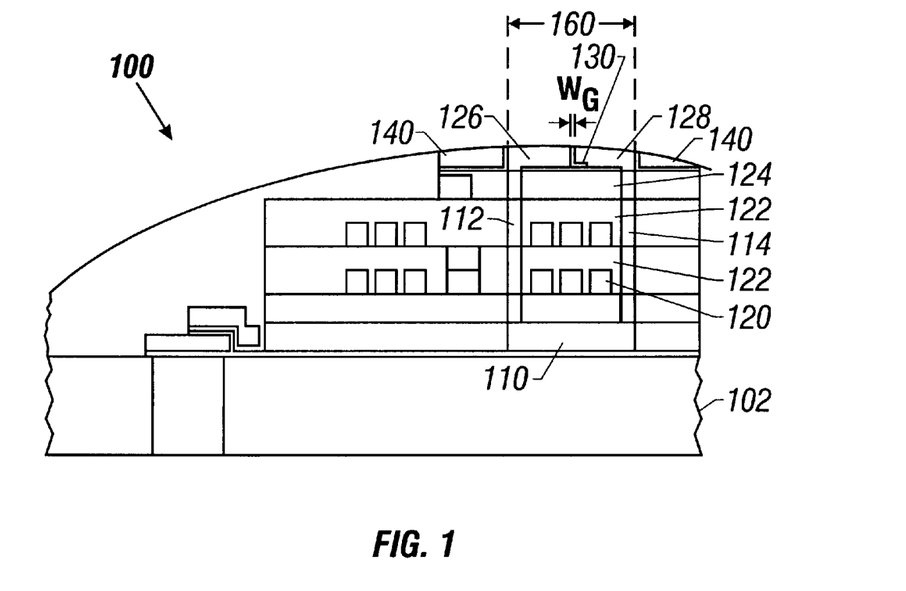
FIG. 1 is a cross sectional view of a thin film substrate including a thin film magnetic head.

Referring to FIG. 1, a thin film magnetic head 100 having a curved surface 104 includes a substrate 102 and a lower pole member 110 constructed of magnetic material and formed on the substrate 102 and having first and second ends. The thin film magnetic head 100 includes first and second side pole members 112 and 114 which are also constructed of magnetic material and are positioned respectively at the first and second ends of the lower pole member 100. The first and second side pole members 112 and 114 are built up from a plurality of layers of magnetic material deposited layer upon layer. The first and second side pole members 112 and 114 include tops and bottoms. The thin film magnetic head 100 also includes conductor coils 120 which are formed around one of the first and second side pole members 112 and 114 and is separated from the first and second side pole members 112 and 114 by insulative layers 122. The thin film magnetic head 100 further includes an insulative pedestal 124 formed at the tops of the first and second side pole members 112 and 114, the insulative pedestal 124 extending above the plane of the insulative layers 122 below and surrounding the tops of the first and second side pole members 112 and 114. The thin film magnetic head 100 includes first and second magnetic poles 126 and 128 formed overlying the insulative pedestal 124, the first magnetic pole 126 extending from the first side pole member 112 toward the second magnetic pole 128, the second magnetic pole 128 extending from the second side pole member 114 toward the first magnetic pole 126. The magnetic pole members 110, 112, 114, 126 and 128 are constructed from a magnetic material such as nickel-iron (NiFe). A gap region 130 is formed between the first and second magnetic poles 126 and 128 and is filled with non-magnetic material. The thin film head 100 further includes a protective diamond-like carbon (DLC) frame 140 formed lateral to the first and second magnetic poles 126 and 128 and surrounding the first and second magnetic poles 126 and 128. The DLC frame 140 supplies both structural integrity and wear protection to the thin film magnetic head 100. The first and second magnetic poles 126 and 128 and the gap region 130 form a head media interface (HMI) 160 having the curved surface 104 profile.

Chemical-mechanical contouring (CMC) utilizes application of polishing pad in a typically orbital or planetary motion to a stationary thin film substrate. The orbital or planetary motion is applied to the thin film substrate by a lapping surface of the polishing pad to planarize a plurality of structures on a substrate, typically as an intermediate step in thin film processing so that, as layers of a thin film magnetic head structure are deposited and etched, successive layers are selectively planarized. The planarization of intermediate layers is performed to ready the thin film surface for subsequent layer depositions.

CMC processing further involves application of a chemical slurry to the polishing pad and the thin film substrate workpiece to generate a chemical etching while the workpiece is mechanically contoured. The slurry is a mixture of a chemical etchant and an abrasive compound. As the slurry and polishing motion of the polishing pad are applied to the thin film substrate workpiece, the workpiece is lapped by a lapping surface of the polishing pad.

Figure 2:
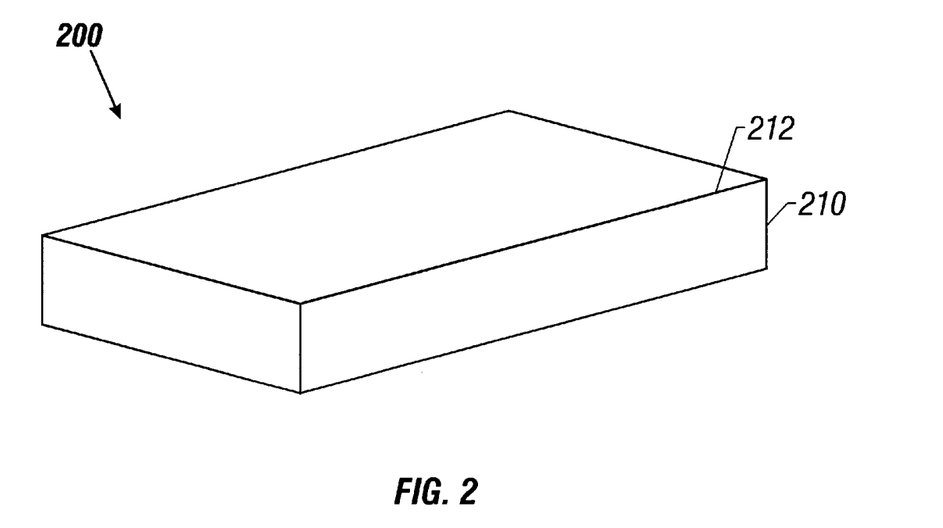
FIG. 2 is a three-dimensional perspective view of an individual thin film magnetic head having a planarized planar, parallelepiped structure.
Figure 3:
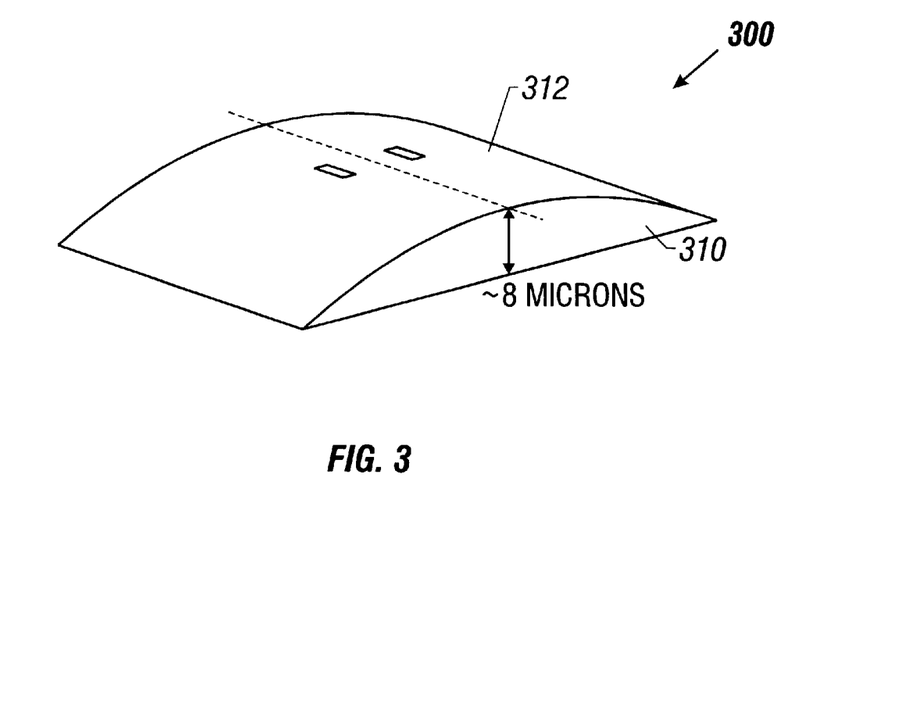
FIG. 3 is a three-dimensional perspective view of an individual thin film magnetic head having a curved structure resulting from CMC processing in accordance with the present invention.

Referring to FIG. 2, a three-dimensional perspective view shows an individual thin film magnetic head 200 having a planarized planar, rectangular parallelepiped structure that results using a conventional fabrication process in which individual thin film magnetic heads are diced from a substrate 210 and then planarized with edges 212 remaining substantially sharp and very little contouring or rounding of edges. In contrast, special CMC processing after completion of the fundamental thin film head structure 300 but before dicing of the substrate forms a curved, contoured or rounded surface 312 on the substrate 310 for the individual thin film magnetic heads of a substantial plurality of heads on a thin film substrate as shown in FIG. 3. Magnetic head performance is improved when the edges of the thin film head structure are rounded.

Figure 4:
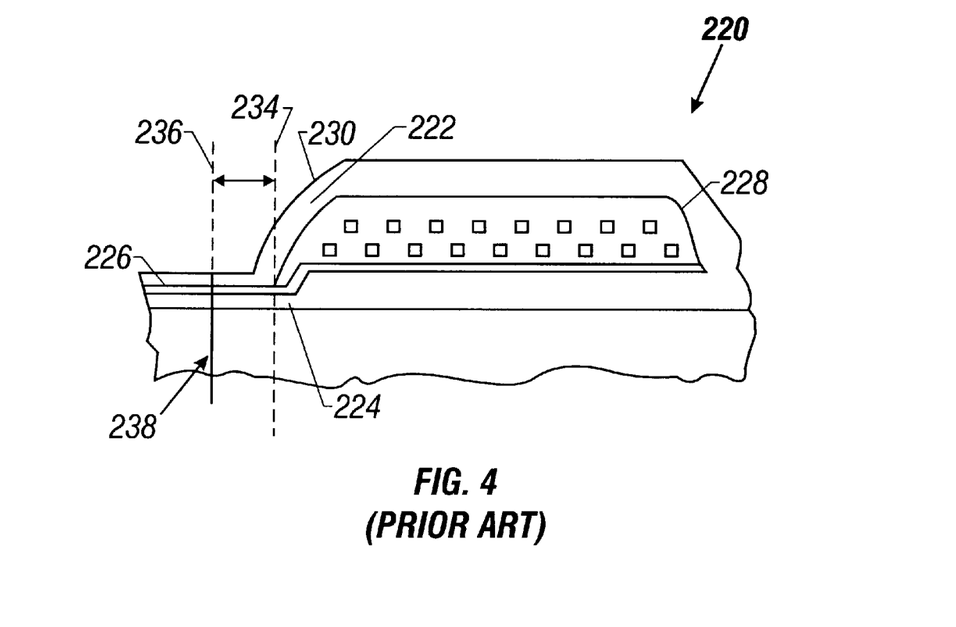
FIG. 4 is a sectional view of a conventional thin film magnetic head which illustrates one problem with the thin film magnetic head having sharp and abrupt edges formed using conventional fabrication processes.

Referring to FIG. 4, a sectional view of a conventional thin film magnetic head 220 illustrates one problem with the thin film magnetic head having sharp and abrupt edges which are formed using conventional fabrication processes. The conventional thin film magnetic head 220 includes an upper pole piece 222, a lower pole piece 224 and a gap region 226. The upper pole piece 222 has a substantially planar upper surface 228, a curved portion 230 which curves toward the lower pole piece 224, and a substantially planar surface 232 where the upper pole piece 222 is formed in close proximity to the lower pole piece 224. The point at which the upper and lower pole pieces 222 and 224 come together is termed an inner apex 234. The upper and lower pole pieces 222 and 224 extend beyond the inner apex 234 to a plane 236 at which the thin film magnetic head 220 is cut and a portion of the head removed, forming a planar surface 238 substantially perpendicular to the substantially planar upper surface 228. The distance from the inner apex 234 to the planar surface 238 is called a throat height. The portion of the thin film head is removed by sawing, grinding, lapping and polishing steps in a conventional process. Thin film heads should perform in a consistent manner and the performance of a thin film head is highly dependent on the throat height. Specifically, the quality of recording and playback signals is highly dependent on throat height. Typically, throat height should have a uniformity among a plurality of heads within one micron.

In one conventional process, thin film heads are diced into individual heads and the distal portion of the head is removed for each head individually. A suitable uniformity is very difficult to achieve when the heads are processed individually.

In an alternative conventional process, thin film heads are sliced into rows of ten to sixteen heads the distal end of all heads in a row are removed simultaneously using a row tool. Unfortunately, uniformity of throat height is not greatly improved since both the row tool that shears the distal head portion and the row of heads bow during the shearing process.

The special CMC processing method disclosed herein completely avoids the problem of throat height nonuniformity since the contoured surface that occurs naturally using special CMC processing forms a suitable recording and playback surface without any sawing or grinding steps.

Figure 5A:
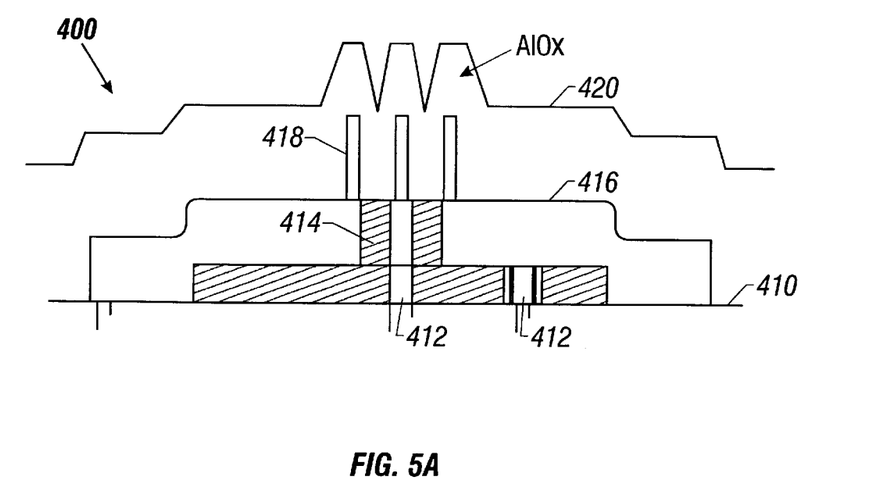
FIGS. 5(A) to 5(C) are sectional views of a thin film magnetic head which illustrate steps of a process for forming a contoured surface.
Figure 5B:
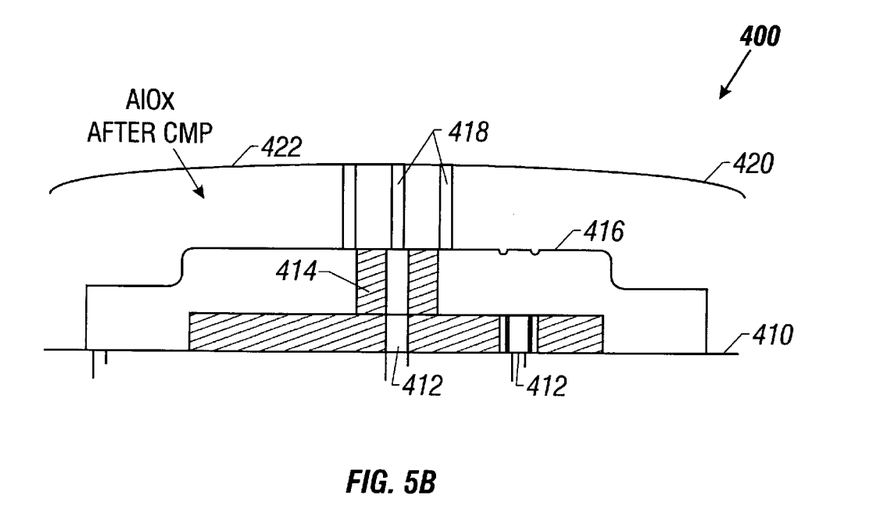
Figure 5C:
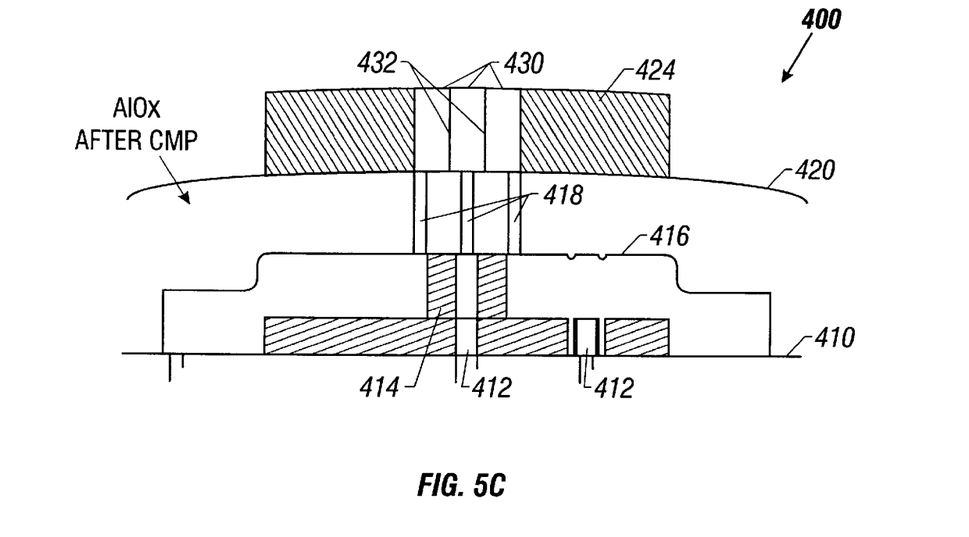

Referring to FIGS. 5(A) to 5(C), the special CMC processing that is used to form thin film heads with a curved structure is substantially different from conventional CMP processing that is typically used to planarize surface structures in intermediate steps of integrated circuit fabrication. For example, a conventional CMP processing procedure involves a mechanical polishing using a hard polishing pad applied at a high speed and low pressure, for example a speed of 50 or more revolutions per minute (rpm), corresponding to a linear speed of 25 inches per second (ips), or faster and a pressure of 2 psi or less. A typical speed and pressure of a conventional process is 60 rpm and 1 psi. A hard polishing pad typically has a compressibility of less than about ten or twelve percent. The conventional CMP processing procedure typically uses a slurry with a dry etchant that etches using either chemical or physical reactions between a low pressure plasma and the surface to be etched.

In contrast, the special CMC processing for thin film magnetic head planarization to form curved-shape thin film heads employs a compliant, or soft, polishing pad which develops an advantageous curved shape, thereby improving the head-to-media interface of the magnetic thin-film magnetic head. One example of a soft polishing pad is a Model 205 pad from Rodel Products Corp. of Scottsdate, Ariz.. This soft polishing pad is constructed from napped poromeric synthetics and has a compressibility of from 20 to 38 percent. In contrast, a typical hard polishing pad is constructed from polyurethane impregnated polyester felts. The mechanical contouring of the special CMC process also employs a soft polishing pad applied at a relatively low speed and a relatively high pressure to the thin film substrate surface. The softness of the polishing pad is selected to determine the shape and contour of the curved thin film substrate surface, specifically to achieve a rounded surface. The low speed of the special CMC processing is typically on the order of ⅓ the speed of a conventional CMP process. For example, a typical low processing speed is approximately 10 RPM to 40 RPM, corresponding to a linear speed of 5 ips to 20 ips. The relatively high pressure of the special CMC processing is typically on the order of two to three times the pressure of a conventional CMP procedure. For example, a typical high processing pressure is approximately 2 psi to 10 psi. The special CMC processing employs either conventional orbital motion of the polishing pad or a rectilinear motion between the thin film substrate and the polishing pad table. Slurry is heavily applied saturation in the special CMC processing.

To avoid recession of the first and second magnetic poles 126 and 128 below the surface formed by the DLC frame 140 shown in FIG. 1, a special CMC process that is negatively selective of NiFe in comparison to DLC or, conversely, positively selective of DLC in comparison to NiFe, is advantageously used to form a thin film magnetic head 300 having a substantially planar surface with substantially no magnetic pole recession. The CMC process utilizes a mechanical action which is generated by movement on a suitable surface, or "lap". The surface of a thin film substrate to be contoured using CMC is substantially saturated with a slurry that contains a chemical etchant and finely graded particles of a hard material such as alumina or diamond-like carbon (DLC) The finely graded particles of finely graded materials operate to remove surface layers from the DLC and enable and enhance reaction of the DLC with the etchant.

The CMC process uses a chemical etchant that is negatively selective of the NiFe or positively selective of the DLC so that the surface of the first and second magnetic poles 126 and 128 remains level, or slightly elevated, with respect to the DLC frame 140. An oxygen-rich liquid, such as hydrogen peroxide ($H_2O_2$), preferentially etches DLC. A lapping material which is negatively selective of the NiFe magnetic pole material uses an oxygen-rich etchant, such as hydrogen peroxide ($H_2O_2$), in the CMC process. In other embodiments, other oxygen-rich etchants may be used including HOCl, KOCl, $KMgO_4$, and $CH_3COOH$. The abrasive portion of the slurry includes finely graded particles of a hard material such as alumina or diamond. The oxygen-rich chemical etchant and the abrasive material are mixed in a slurry to form the lapping material. Advantageously, when the thin film magnetic head is lapped using this etchant, the DLC is preferentially etched and the etchant leaves the NiFe pole regions 126 and 128 relatively undisturbed.

Referring to FIGS. 5(A) to 5(C), several sectional views of a thin film magnetic head 400 illustrate steps of a process for forming a contoured surface.

Referring to FIG. 5(A), the thin film magnetic head 400 is fabricated using integrated circuit-type processing steps to include a substrate 410, a plurality of magnetic side poles 412 patterned onto the surface of the substrate 410, and an insulator 414 overlying the substrate 400 and formed lateral to the magnetic side poles 412. A magnetic yoke 416 is formed overlying and lateral to the insulator 414 and magnetic side poles 412. Additional side poles 418 are formed overlying the surface of the magnetic yoke 416. A dielectric layer, such as an aluminum oxide layer 420, is sputtered overlying and lateral to the structure formed by the magnetic yoke 416 and additional side poles 418 of the thin film magnetic head 400. The surface of the aluminum oxide layer 420 includes various sharp and jagged edges, particularly overlying the additional side poles 418.

Referring to FIG. 5(B), a rounded or contoured surface 422 is produced using the described chemical-mechanical contouring (CMC) technique using a soft polishing pad applied at a relatively low speed and a relatively high pressure to the thin film substrate surface.

Referring to FIG. 5(C), magnetic pole tips 430 are formed, separated by gap regions 432 for a two-gap thin film magnetic head 400. A protective frame, such as a diamond-like carbon (DLC) frame 424, is formed overlying the contoured surface 422 of the aluminum oxide layer 420 and lateral to the magnetic pole tips 430 and gap regions 432. The formation of a contoured surface of the magnetic pole tips 430 which is different from the shape of the surface of the gap regions 432 is believed to improve recording and playback performance of a thin film magnetic head by attenuating and broadening signal undershoot.

Figure 5D:
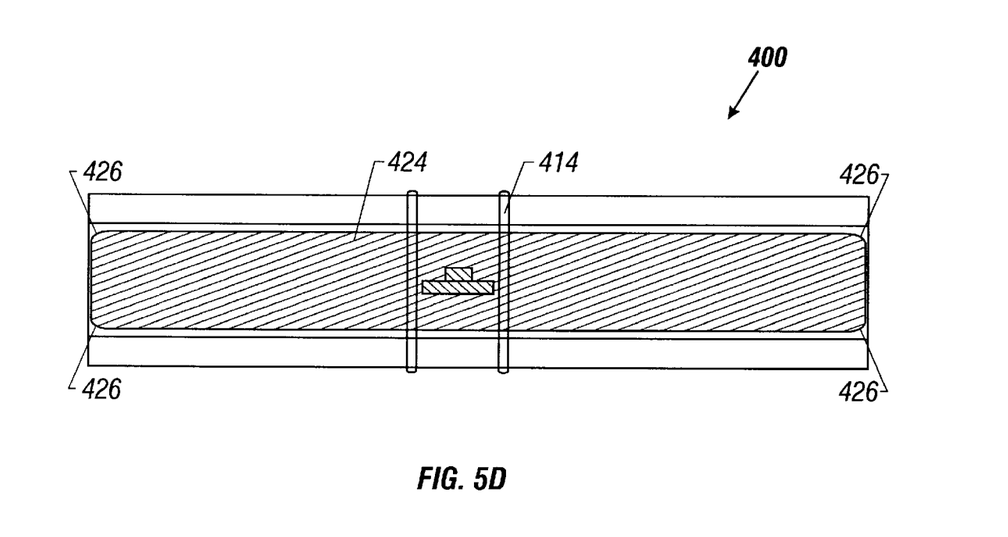
FIG. 5(D) is a plan view of the thin film magnetic head shown in FIG. 5(C).

FIG. 5(D) illustrates a top plan view of the thin film magnetic head. The top plan view illustrates smoothing of the prior rectangular structure in the lateral dimension including rounding of edges 426.

Figure 6A:
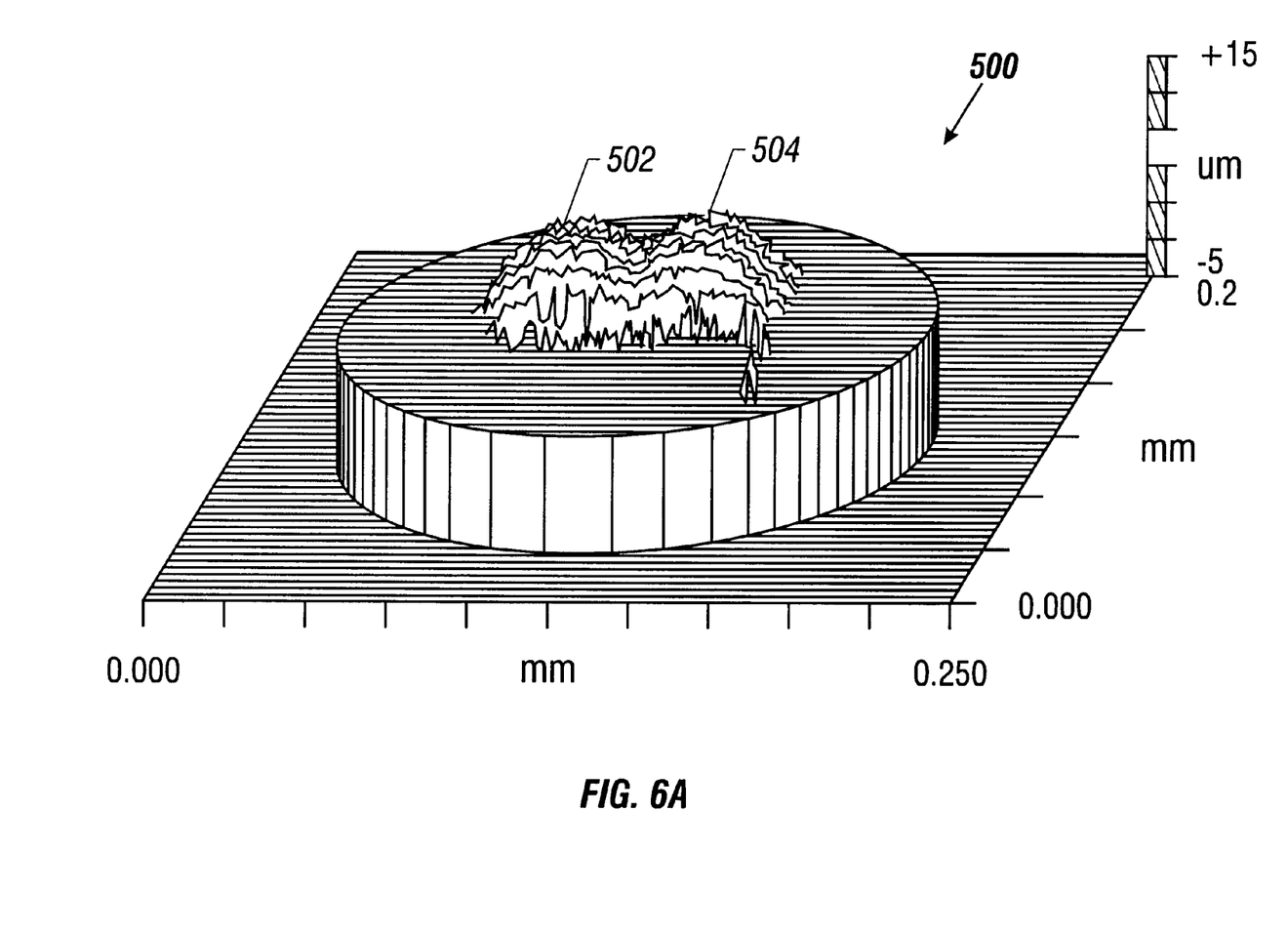
FIGS. 6(A) and 6(B) are, respectively, a three-dimensional view and a two-dimensional schematic profile measurement of a thin film magnetic head embodiment including two gaps.
Figure 6B:
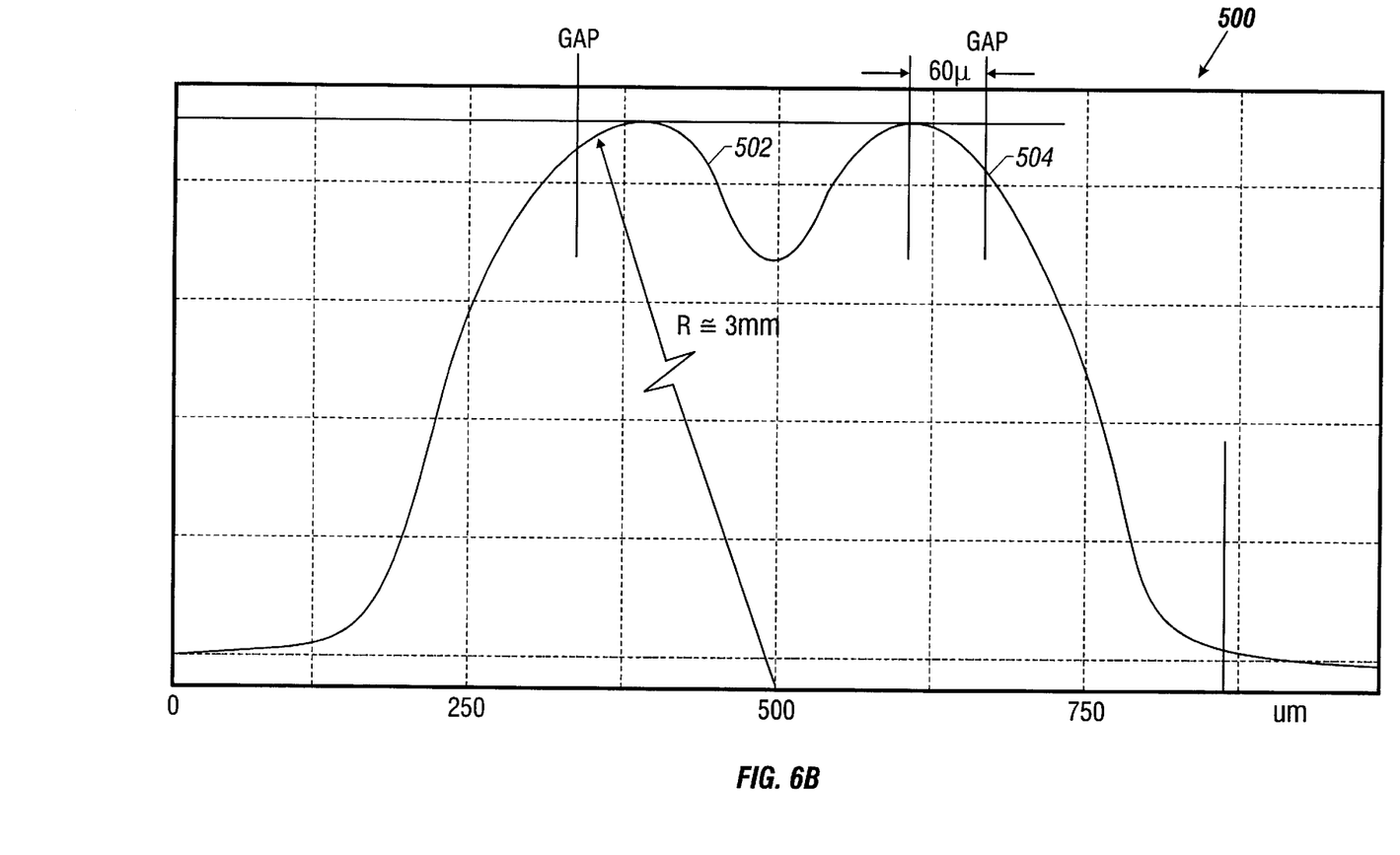

Various new contoured thin film structures may be generated using the described CMC technique which have not been produced using conventional grinding wheel and lapping techniques. FIGS. 6(A) and 6(B) illustrate one of these new contoured thin film structures. Specifically, FIG. 6(A) is a three-dimensional view of a thin film magnetic head 500 including two gaps 502 and 504. The smooth, nearly hemispherical shape of the thin film magnetic head gap structure is not created using conventional grinding wheel and lapping techniques. Conventional grinding wheel and lapping techniques produce a jagged, angular structure. FIG. 6(B) depicts a two-dimensional sectional schematic profile measurement of the thin film magnetic head 500 including two gaps 502 and 504.

While the invention has been described with reference to various embodiments, it will be understood that these embodiments are illustrative and that the scope of the invention is not limited to them. Many variations, modifications, additions and improvements of the embodiments described are possible. For example, although the material which is formed using the CMC process is a dielectric material, other materials may be formed or contoured using the described CMC process. Furthermore, although the described dielectric material is described in the illustrative embodiment as aluminum oxide, other dielectric materials may similarly be processed using the CMC technique. Also, although a protective structure of the thin film magnetic head is described as being a diamond-like carbon (DLC) structure, other types of protective materials may be used.

What is claimed is:

1. A thin film processing method comprising:
    fabricating a finished thin film substrate including a plurality of magnetic thin-film head devices, the magnetic thin-film head devices having a head structure that is raised relative to a planar surface of the thin film substrate, the planar surface transitioning to the raised head structure through a throat height; and
    chemical mechanical contouring (CMC) the thin film substrate subsequent to the fabrication step to form a substantially smooth, curved surface overlying ones of the plurality of magnetic thin-film head devices so that throat height is uniform to a defined tolerance among the plurality of magnetic thin-film head devices.

2. A method according to claim 1 wherein the CMC operation includes:
    contouring the thin film substrate using a soft polishing pad.

3. A method according to claim 1 wherein the CMC operation includes:
    contouring the thin film substrate at a high pressure.

4. A method according to claim 1 wherein the CMC operation includes:
    contouring the thin film substrate at a high pressure in a range of approximately 2 psi to 10 psi.

5. A method according to claim 1 wherein the CMC operation includes:
    contouring the thin film substrate at a slow speed.

6. A method according to claim 1 wherein the CMC operation includes:
    contouring the thin film substrate at a slow speed in a range of 10 RPM to 40 RPM, corresponding to a linear speed of 5 ips to 20 ips.

7. A method according to claim 1 wherein the CMC operation includes:
    contouring the thin film substrate using a substantially saturating amount of slurry.

8. A method according to claim 1 wherein the CMC operation includes: contouring the thin film substrate using a substantially saturating amount of alumina slurry.

9. A method according to claim 1 wherein the CMC operation includes:
    contouring the thin film substrate using a soft polishing pad, a high pressure and slow speed using a flood slurry.

10. A method according to claim 1 wherein the CMC operation includes:
    contouring the thin film substrate using a orbital, planetary motion.

11. A method according to claim 1 wherein the CMC operation includes:
    contouring the thin film substrate using a rectilinear motion.

12. A method according to claim 1 wherein the CMC operation includes:
    contouring the thin film substrate using a soft polishing pad with the hardness of the polishing pad being selected to determine a contour of the curved surface.

13. A method according to claim 1 wherein the thin film substrate has a surface and includes a magnetic pole and a hard frame, the magnetic pole and the hard frame extending to the thin film substrate surface; and
    the thin film substrate surface is polished using a chemical-mechanical contouring process using a slurry including an oxygen-rich etchant and a solid abrasive material, the slurry being positively selective of the hard frame in comparison to the magnetic pole.

14. A method according to claim 13 wherein the magnetic pole is a nickel-iron (NiFe) magnetic pole.

15. A method according to claim 13 wherein the hard frame is constructed from diamond-like carbon (DLC).

16. A method according to claim 13 wherein the oxygen-rich etchant includes hydrogen peroxide ($H_2O_2$).

17. A method according to claim 13 wherein the solid abrasive material includes finely graded particles of alumina or diamond.

18. A thin film processing method comprising:
    fabricating a finished thin film substrate including a plurality of thin film magnetic heads, the magnetic thin-film heads being raised relative to a planar surface of the thin film substrate, the planar surface transitioning to the raised head through a throat height; and chemical mechanical contouring (CMC) the thin film substrate subsequent to the fabrication step to form a substantially smooth, curved surface overlying ones of the plurality of thin film magnetic heads so that throat height is uniform to a defined accuracy among the plurality of magnetic thin-film heads.

19. A method according to claim 18 wherein the CMC operation includes:

contouring the thin film substrate using a soft polishing pad.

20. A method according to claim 18 wherein the CMC operation includes:

contouring the thin film substrate at a high pressure.

21. A method according to claim 18 wherein the CMC operation includes:

contouring the thin film substrate at a high pressure in a range of approximately 2 psi to 10 psi.

22. A method according to claim 18 wherein the CMC operation includes:

contouring the thin film substrate at a slow speed.

23. A method according to claim 18 wherein the CMC operation includes:

contouring the thin film substrate at a slow speed in a range of 10 RPM to 40 RPM, corresponding to a linear speed of 5 ips to 20 ips.

24. A method according to claim 18 wherein the CMC operation includes:

contouring the thin film substrate using a substantially saturating amount of slurry.

25. A method according to claim 18 wherein the CMC operation includes:

contouring the thin film substrate using a substantially saturating amount of alumina slurry.

26. A method according to claim 18 wherein the CMC operation includes:

contouring the thin film substrate using a orbital, planetary motion.

27. A method according to claim 18 wherein the CMC operation includes:

contouring the thin film substrate using a rectilinear motion.

28. A method according to claim 18 wherein the CMC operation includes:

contouring the thin film substrate using a soft polishing pad with the hardness of the polishing pad being selected to determine a contour of the curved surface.

29. A method according to claim 1 wherein the CMC operation forms the magnetic thin-film head devices so that the throat height is uniform among the plurality of magnetic thin-film head devices within one micron.

30. A method according to claim 18 wherein the CMC operation forms the magnetic thin-film heads so that the throat height is uniform among the plurality of magnetic thin-film heads within one micron.

* * * * *